(12) United States Patent
Lal (10) Patent No.: US 9,176,725 B2
(45) Date of Patent: Nov. 3, 2015

(54) AUTOMATED UPGRADE FOR AN OPERATING SYSTEM USING A GATEWAY SERVER

(75) Inventor: Sunil Lal, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 77 days.

(21) Appl. No.: 13/471,710

(22) Filed: May 15, 2012

(65) Prior Publication Data

US 2013/0311982 A1    Nov. 21, 2013

(51) Int. Cl.
*G06F 9/44* (2006.01)
*G06F 9/445* (2006.01)

(52) U.S. Cl.
CPC .......................................... *G06F 8/65* (2013.01)

(58) Field of Classification Search
CPC .......................................................... G06F 9/44
See application file for complete search history.

(56) References Cited

U.S. PATENT DOCUMENTS

| | | | |
|---|---|---|---|
| 6,381,742 B2 * | 4/2002 | Forbes et al. | 717/176 |
| 6,636,894 B1 * | 10/2003 | Short et al. | 709/225 |
| 6,662,363 B1 * | 12/2003 | Miyamoto | 717/174 |
| 7,062,765 B1 * | 6/2006 | Pitzel et al. | 717/177 |
| 7,565,448 B1 * | 7/2009 | Schlesener et al. | 709/242 |
| 7,624,175 B1 * | 11/2009 | Schlesener et al. | 709/224 |
| 7,681,229 B1 * | 3/2010 | Ebrahimi et al. | 726/4 |
| 7,827,549 B2 * | 11/2010 | Tarassov | 717/174 |
| 7,870,245 B2 * | 1/2011 | Butler | 709/224 |
| 8,429,256 B2 * | 4/2013 | Vidal et al. | 709/221 |
| 2002/0083342 A1 * | 6/2002 | Webb et al. | 713/201 |
| 2002/0103931 A1 * | 8/2002 | Mott | 709/245 |
| 2006/0059092 A1 * | 3/2006 | Burshan et al. | 705/51 |
| 2010/0107225 A1 * | 4/2010 | Spencer et al. | 726/4 |
| 2010/0138534 A1 * | 6/2010 | Mutnuru et al. | 709/224 |
| 2011/0137973 A1 * | 6/2011 | Wei et al. | 709/202 |
| 2013/0007183 A1 * | 1/2013 | Sorenson et al. | 709/213 |
| 2013/0031542 A1 * | 1/2013 | Arcilla et al. | 717/177 |
| 2013/0125107 A1 * | 5/2013 | Bandakka et al. | 717/171 |

* cited by examiner

*Primary Examiner* — Chat Do
*Assistant Examiner* — Jae Jeon
(74) *Attorney, Agent, or Firm* — Kraguljac Law Group, LLC (57) ABSTRACT

Systems, methods, and other embodiments associated with automated upgrade of an operating system are described. In one embodiment, a method includes receiving a request for an upgrade package in a gateway server from a remote device and determining a source location for the upgrade package. The example method may also include sending the request to the source location to cause the source location to provide the upgrade package to the remote device.

17 Claims, 5 Drawing Sheets

AUTOMATED UPGRADE FOR AN OPERATING SYSTEM USING A GATEWAY SERVER

BACKGROUND

An operating system (OS) is a set of programs that manage computer resources and provide common services for application software in a computer. The OS allows many different types of applications to operate on the same computer. To provide this functionality, the OS includes many different parts that interact to provide services to the applications. Accordingly, as applications and hardware change, the different parts of the OS are updated to ensure that the OS can provide the correct services to the new applications and/or hardware.

To update the operating system, a configuration file is used to identify update files and the location of the update files. The configuration file is hard coded with the specific names and locations of the update files. However, the location of the update files often changes after the configuration file is created. When the location changes, a subsequent update fails because the computer performing the update is unable to determine the location of the update files. This difficulty is even more pronounced in a situation when updating many computers with many different configuration files. Accordingly, updating a computer based on a configuration file with hard coded source location information results in many difficulties.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or that multiple elements may be designed as one element. In some embodiments, an element shown as an internal component of another element may be implemented as an external component and vice versa. Furthermore, elements may not be drawn to scale.

DETAILED DESCRIPTION

Systems and methods are described herein that are associated with automated upgrade of an operating system without using hard coded source information. For example, in open source operating systems, e.g., LINUX® or UNIX®, many different sources can provide upgrades. Because the sources of the upgrades for open source operating systems are not limited to a centralized repository, as in proprietary operating systems, the locations of the sources for obtaining the upgrades are varied and often change. Thus, hard coding configuration files with a specific location for an upgrade package often leads to attempted upgrades that fail from being unable to locate the upgrade package.

To perform the upgrade process, open source operating systems use a package management system to coordinate changes. The package management system is a collection of software tools that automate upgrading, installing, configuring, and removing software packages (e.g., upgrade packages). The software packages are specific pieces of software that are used to modify the operating system. The package management system can maintain information about the software packages and the processes it performs using the software packages. The information can include software dependencies, version numbers, checksums, and so on.

Unlike many proprietary operating systems that use independent installers when upgrading, the package management system is part of the open source operating system and, therefore, relies on a configuration file to supply information about a software package. The configuration file identifies, for example, an update action (e.g., install, remove) and a software package to perform the action on. The configuration file is, for example, a Red Hat package manager (RPM) file, a Yellowdog updater, modified (YUM) file, and so on. However, because the configuration file is static, modifying information about the software package can be difficult. Therefore, difficulties arise from the static nature of the configuration file and the dynamic environment of a computer system. The difficulties can result in, for example, an update to the operating system that fails.

Accordingly, in one embodiment, a proxy or gateway server is used during the upgrade process. A computer initiates an upgrade of a local operating system using a configuration file (e.g., RPM, YUM). The configuration file includes information that identifies a specific aspect of the operating system that is to be upgraded. In order to perform the upgrade, an upgrade package (e.g., piece of software) not included with the configuration file needs to be retrieved from a network location. A package management system in the computer uses the information from the configuration file to generate a request for the upgrade package. The request is then transmitted to a network location associated with the upgrade package in order to retrieve the upgrade package for upgrading the operating system.

Once the request is transmitted onto the network it is received at the gateway server. While the gateway server receives the request, the gateway server does not possess the upgrade package. Instead, the gateway server maintains a lookup table for determining source locations of many different upgrade packages. Thus, the gateway server uses the request to dynamically lookup a source location of the upgrade package identified in the request. The gateway server then transmits the request to the source location of the upgrade package determined from the lookup. This dynamic lookup avoids difficulties with a hard coded source location in the configuration file that can be incorrect and, therefore, lead to a failed update.

Figure 1:
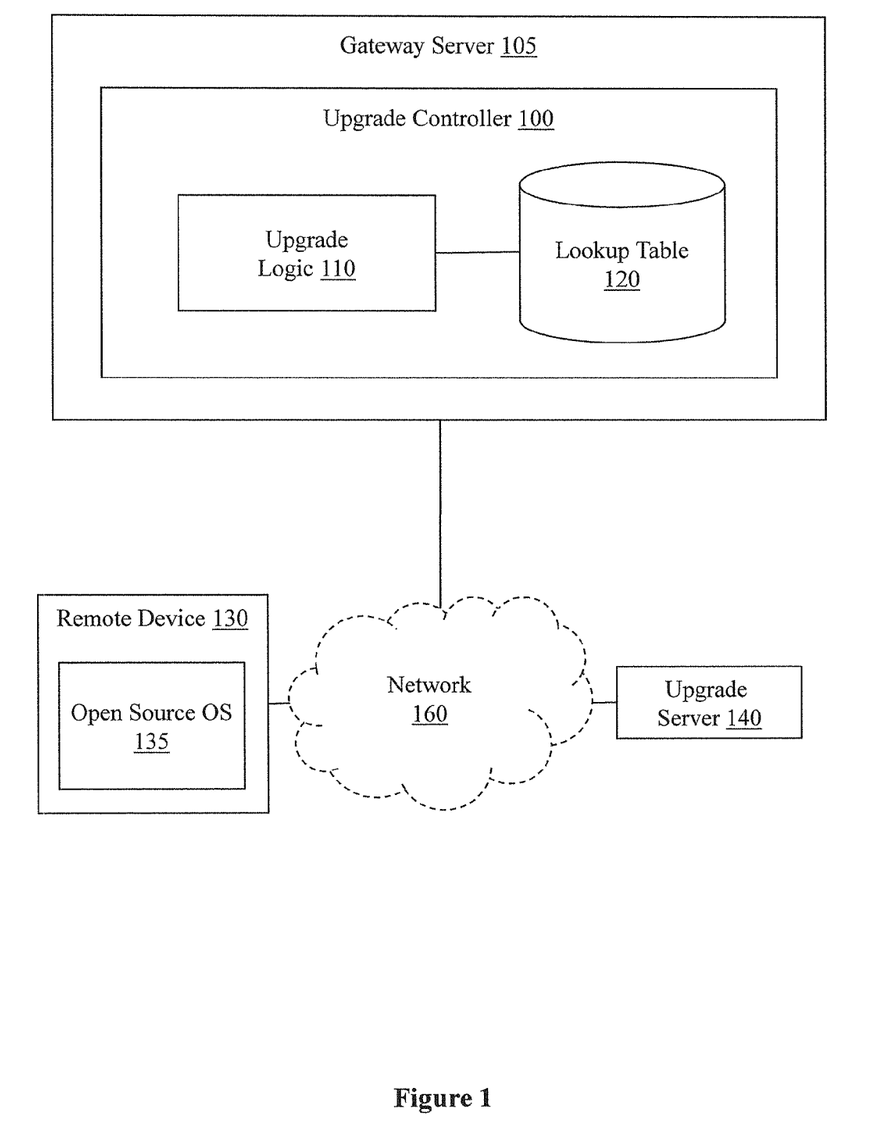
FIG. 1 illustrates one embodiment of an upgrade controller associated with automated upgrade of an OS using a gateway server.

Consider the example shown in FIG. 1. FIG. 1 illustrates one embodiment of an upgrade controller 100 in a gateway server 105 associated with automated upgrade of an open source operating system using configuration files. In FIG. 1, the upgrade controller 100 includes an upgrade logic 110 and a lookup table 120. The gateway server 105 is connected to a network 160. The network 160 includes, for example, wired and/or wireless communication channels for providing communications between the gateway server 105 and other devices connected to the network 160. In one example, a remote device 130 and an upgrade server 140 are also connected to the network 160. The remote device 130 includes an open source operating system 135 (e.g., LINUX®) that is to be upgraded. The upgrade server 140 is a device connected to the network 160 that provides software/upgrade packages to requesting devices such as the remote device 130. The upgrade server 140 is, for example, a repository for many different files and can provide files via HTTP requests, FTP requests and similar network file requests.

In the example shown in FIG. 1, the open source operating system 135 is running on the remote device 130. Accordingly, consider that the open source operating system 135 is out-of-date and needs to be upgraded. The upgrade can be to, for example, cure security defects in the current version of the open source operating system 135 or to provide additional features for a new application that is to be installed on the remote device 130. Prior to initiating the upgrade, a configuration file is retrieved by the remote device 130 via the network 160 or through a portable memory (e.g., compact disk or flash memory stick). In general, the configuration file originates from a location outside of the remote device 130 and is downloaded to the remote device 130.

The configuration file is initiated in the remote device 130 to begin the upgrade. The configuration file is a file that is compatible with a package management system for upgrading software in the applicable operating system (e.g., the LINUX® operating system in this example). The configuration file can be an RPM file, a YUM file, and so on.

In one embodiment, the configuration file includes information used by the package management system of the open source operating system 135 to perform the upgrade. For example, information in the configuration file can include a list of actions the package management system needs to perform prior to the upgrade. The actions can include removing a previous upgrade, changing a configuration of the remote device 130, and so on. In either case, the configuration file includes at least an identifier of the update package that is to be used to perform the upgrade. In other embodiments, the configuration file includes, for example, an address of the gateway server 105 or a hard coded location of the upgrade package on the network at the time the configuration file was created. While the configuration file can include the hard coded location of the upgrade package, this location is not necessarily correct. Accordingly, as discussed in greater detail below, when the configuration file includes the hard coded location, the gateway server 105 can receive the request by being disposed between the remote device 130 and a location specified by the hard coded location (e.g., along the communication path of the request). In this way, the gateway server can still receive the request and perform a lookup to ensure the request is directed to an appropriate source location.

With continued reference to the remote device 130, the package management system of the open source operating system 135 uses the information from the configuration file to generate a request. The request is used for retrieving the upgrade package. In one embodiment, the request is a hypertext transfer protocol (HTTP) request. Alternatively, the request is, for example, a file transfer protocol (FTP) request or other TCP/IP based request. The request includes information from the configuration file that is used to retrieve the upgrade package. As mentioned in connection with the configuration file, the request includes similar information such as an identifier of the upgrade package, an address of the gateway server 105, a hard coded source location for the upgrade package, and so on.

Accordingly, when the configuration file is initiated on the remote device 130, the request is generated and transmitted onto the network 160 in accordance with the address specified in the configuration file. The gateway server 105 receives the request and transfers the request to the update controller 100 for processing. In one embodiment, the gateway server 105 is, for example, disposed between the remote device 130 and the upgrade server 140 along a communication path. In this way, the gateway server 105 can intercept a request that is sent from the remote device 130 to an upgrade server (e.g., upgrade server 140). This configuration is beneficial when the configuration file is not originally provided with the address of the gateway server 105, but instead includes a hard coded source location (e.g., address) of the upgrade server 140. Being disposed between the two devices allows the gateway server 105 to intercept the request and prevents the request from being sent to an invalid address when the hard coded source location becomes outdated.

However, in other embodiments, the gateway server 105 is not disposed between the remote device 130 and the upgrade server 140. Instead, the gateway server 105 is simply connected to the network 160 and receives the request as a result of the configuration file including the address of the gateway server 105. In another embodiment, a default configuration of the package management system in the open source operating system 135 automatically directs all requests to the gateway server 105.

The upgrade controller 100 processes the request upon the request being received in the gateway server 105. In one embodiment, the upgrade logic 110 begins processing the request by examining the request for information that identifies one or more upgrade packages (e.g., upgrade package identifier(s)). The upgrade logic 110 may also examine the request for information about the remote device 130 that sent the request. The information about the remote device 130 can include a list of previously installed upgrades on the remote device 130, performance characteristics of the remote device 130 (e.g., processor speed), and so on. The upgrade logic 110 is configured to use the information about the remote device 130 to select a source location for the requested upgrade package when multiple source locations are available.

The upgrade logic 110 can also use the information about the remote device 130 to determine if the remote device 130 is capable of installing the upgrade package. That is, whether the system specifications for the remote device 130 are sufficient for operating the open source operating system 135 with the requested upgrade package installed. If the upgrade logic 110 determines that the remote device 130 is not capable of operating with the requested upgrade package an error message can be provided to the remote device 130 instead of the upgrade package.

To resolve a source location for upgrade packages specified in the request, the upgrade logic 110 is configured to use the upgrade package identifier(s) to perform a lookup operation in the lookup table 120. The lookup table 120 is, for example, a database of available upgrade packages and devices that provide the upgrade packages. Accordingly, the lookup operation can return several source locations for a single upgrade package. The upgrade logic 110 is configured to select one source location from the source locations returned from the lookup operation.

To select one source location, the upgrade logic 110 uses the information about the remote device 130 to select a source location that is best suited for the remote device 130. In one example, a source location that is best suited for the remote device 130 is a source location that provides additional upgrade packages that are also listed in the request or additional upgrade packages necessary to install the requested upgrade package that are not explicitly identified. Additionally, a source location can be selected based on a proximity to the remote device 130, current processing loads of the source locations that are available, and so on.

After the upgrade logic 110 has resolved a source location for the request, the request is forwarded to the resolved source location. In this way, the gateway server 105 acts as a router to ensure that the request is sent to the resolved source location that has the upgrade package. In another embodiment, the gateway server 105 can send a message back to the remote device 130, instead of forwarding the request. In this example, the remote device 130 is permitted to contact the resolved source location on its own volition to request the upgrade package in order to provide more control to the remote device 130.

A source location for the upgrade package is a device (e.g., upgrade server 140) on the network 160 that stores the upgrade package. As discussed above and as illustrated with reference to FIG. 2, multiple source locations can be present on the network 160. For example, in FIG. 2, the network 160 may include upgrade servers 140a, 140b, and 140c through 140n.

Figure 2:
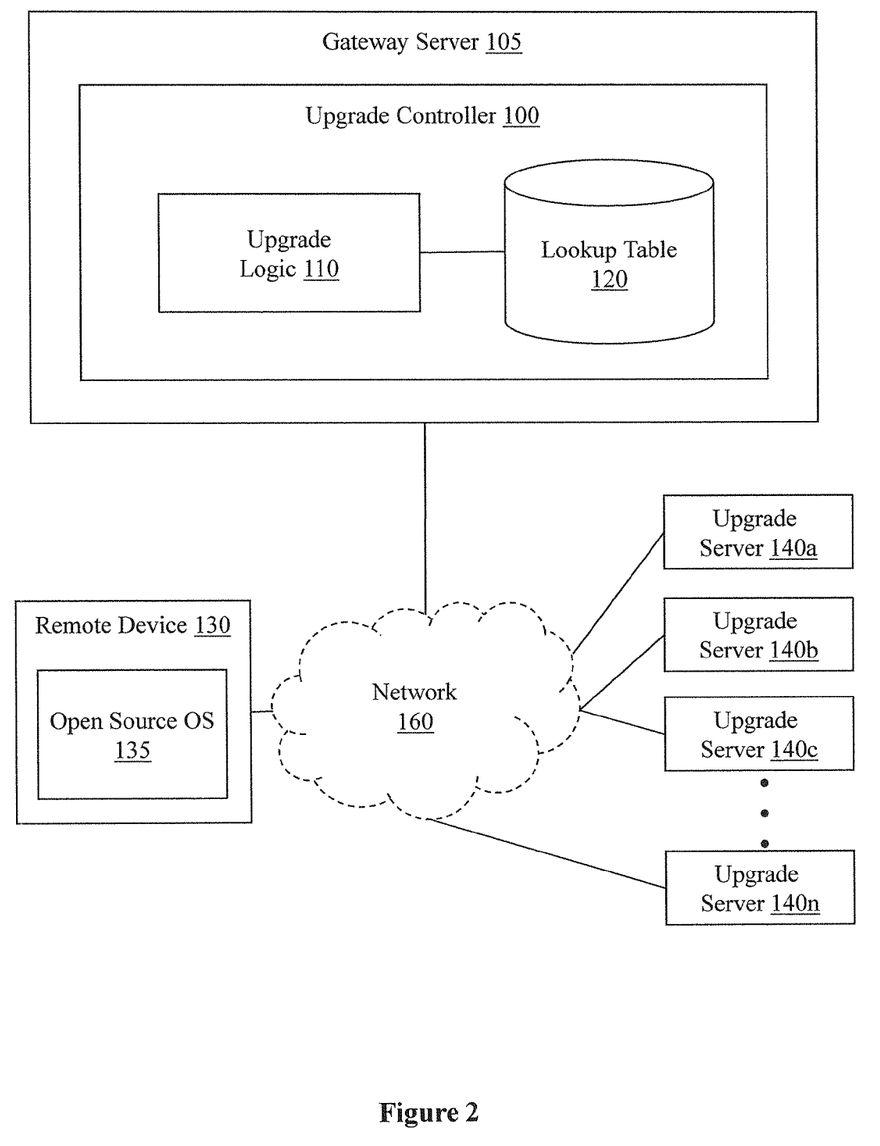
FIG. 2 illustrates another embodiment of an upgrade controller associated with automated upgrade of an OS using a gateway server.

Additionally, upgrade packages available through the upgrade servers 140a-n (i.e., source locations) can periodically change based on, for example, a level of demand for different upgrade packages. In addition to upgrade packages periodically changing, the addresses for the various upgrade servers 140a-n that contain the upgrade packages can also change by, for example, being moved to a different physical location or by changing the configuration of the upgrade server, which changes its address. Thus, the upgrade controller 100 maintains the lookup table 120 to provide an up-to-date repository of addresses for the various upgrade servers 140a-n and upgrade packages available from the various upgrade servers 140a-n. In this way, difficulties with hard coded source locations in configuration files can be avoided.

Figure 3:
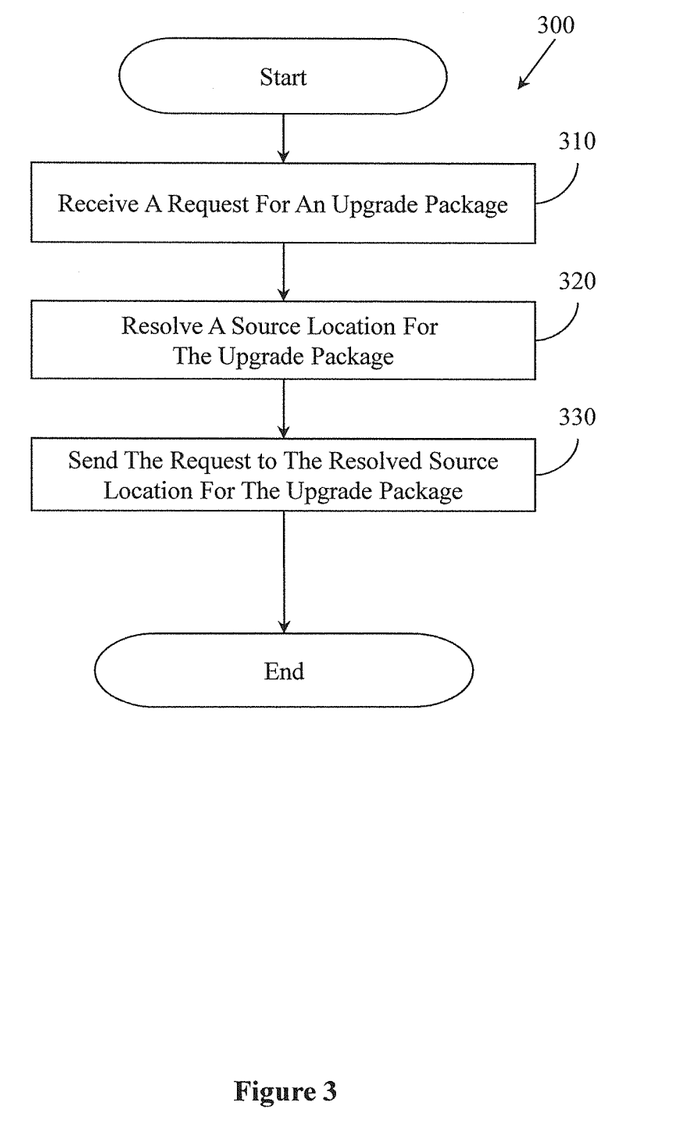
FIG. 3 illustrates one embodiment of a method associated with automated upgrade of an OS using a gateway server.

Further details of automatically resolving a source location from a request will be discussed in conjunction with FIG. 3. FIG. 3 illustrates one embodiment of a method 300 associated with automated upgrade of an operating system. FIG. 3 is discussed from the perspective that the method 300 is implemented and performed by, for example, the gateway server 105 of FIG. 1.

Method 300 begins, at 310, when a request for an upgrade package is received. In one embodiment, the request is received in the gateway server 105 or a router connected to a network of a requesting device. As discussed previously, the request is for an upgrade package used to modify (e.g., upgrade) an operating system that resides on the requesting device. The request is generated by the requesting device with an address of the gateway server 105 as the destination address. The destination address of the gateway server is known by the requesting device from, for example, a configuration file on the requesting device, a local domain name system (DNS) address known by the requesting device, and so on. In either case, the requesting device uses the address for the gateway server 105 when sending the request.

In another embodiment, if an address for the gateway server 105 is not known, a package management system of the requesting device can send the request to a hard coded source location, which is identified in the configuration file. In this example, the gateway server 105 receives the request before it is provided to the hard coded source location since the gateway server 105 is configured to route network communications between the requesting device and the hard coded source location. In this configuration, the gateway server 105 may be disposed at the edge of a local area network (LAN) between the LAN and the Internet. Thus, all communications from the requesting device to outside devices are funneled through the gateway server 105. Accordingly, the configuration of the network ensures that the gateway server 105 receives the request.

At 320, a source location for the upgrade package is resolved from a lookup table. To resolve the source location, metadata from the request is used to perform a lookup using a lookup table. The metadata includes, for example, an identifier of the upgrade package from the configuration file. The identifier is used to query the lookup table for the source location (e.g., upgrade server) of the upgrade package. From the results of the query, the gateway server 105 obtains the source location. The source location is identified by, for example, a network address that is in turn used as a destination address for forwarding the request.

At 330, the request is sent to the resolved source location from 320. In this way, the request is provided to a valid source location and not a source location (e.g., hard coded source location) that may no longer be valid from an outdated address in the configuration file. The resolved source location that receives the forwarded request is induced by the request to send the upgrade package to the requesting device. Once the requesting device receives the upgrade package, the upgrade of the operating system can be completed.

Actions in the requesting device can be simplified by using the gateway server 105 to perform dynamic source location lookup for upgrade package requests. In this way, the upgrade process for the requesting device is automated by removing sources of error from the requesting device's actions.

Figure 4:
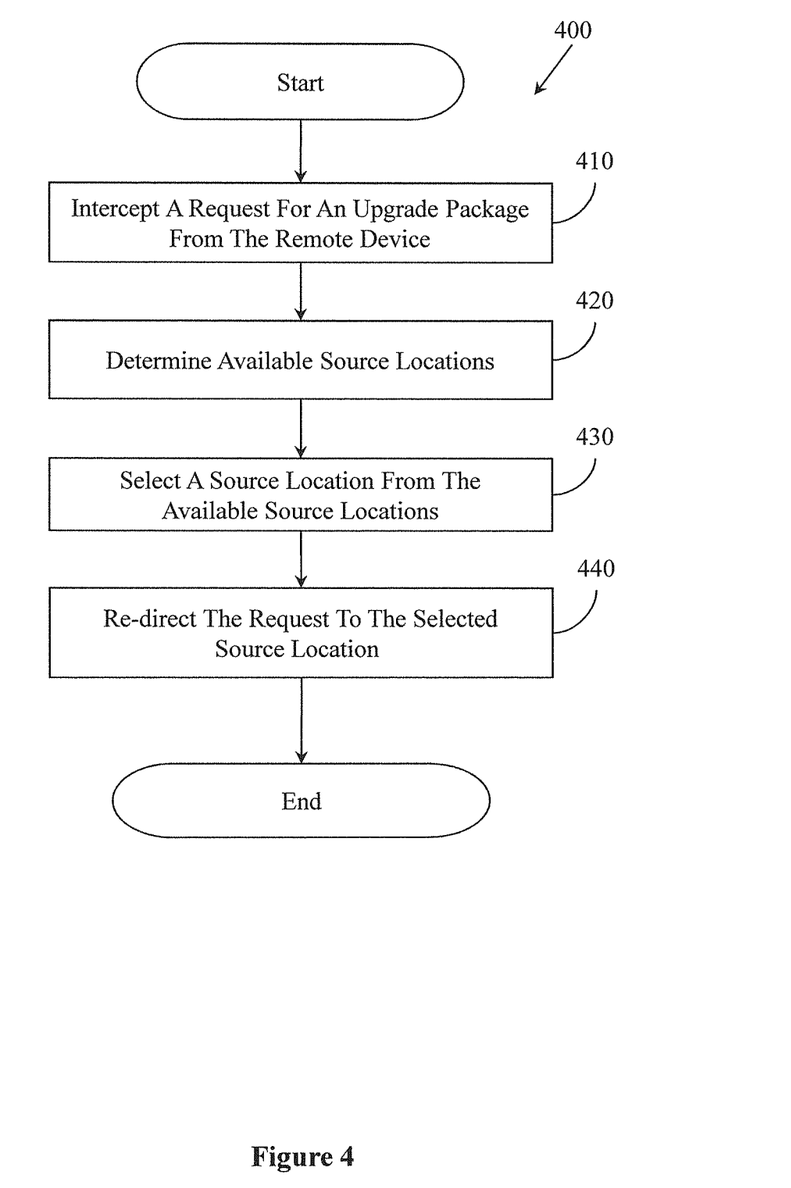
FIG. 4 illustrates another embodiment of a method associated with automated upgrade of an OS using a gateway server.

Another embodiment of automatically resolving a source location from a request will be discussed in conjunction with FIG. 4. FIG. 4 illustrates a method 400 associated with automatically resolving a source location from a request. FIG. 4 is discussed from the perspective that the method 400 is implemented and performed by, for example, a router in the network 160.

At 410, the method 400 begins when the router intercepts a request for an upgrade package from a remote device. In a similar fashion to method 300 at 310, the request is received from a remote device with an open source operating system that is being upgraded. The request includes information about one or more upgrade packages needed by the remote device to upgrade the operating system. The router is capable of intercepting the request because it is situated in the network between the remote device and other devices. For example, the router can be the first hop destination from the remote device (e.g., the remote device's direct connection to the network). Accordingly, the router receives all communications sent from the remote device. Therefore, the router can scan the communications from the remote device for requests and when a request is detected, the request can be forwarded to a valid source location.

At 420, the router determines the available source locations for the upgrade package specified in the request. In a similar fashion to 320 of method 300, the request is parsed for information about the upgrade package and information about the remote device. This information is used to query a database or lookup table in order to determine which upgrade servers are capable of servicing the request.

At 430, a source location is selected from the available source locations with the upgrade package. Since the results of the query from 420 can include more than one available source location that has the upgrade package, at 430, method 400 selects one of the source locations that will receive the request. Multiple parameters can be considered when selecting the source location from available source locations with the upgrade package. These parameters can include whether a source location can also provide additional upgrade packages needed by the remote device, a proximity of the source location to the remote device, current processing loads of the available source locations, and so on.

At 440, the request is re-directed to the selected source location. In one embodiment, re-directing includes changing an original destination of the request that is likely incorrect (e.g., an address for an out-dated upgrade server for a source location) to a valid source location that is selected as discussed at 420 and 430. In this way, difficulties with addresses hard coded in configuration files can be avoided, since the request is re-directed to a valid source location based on the router changing the destination to a known valid source location.

Figure 5:
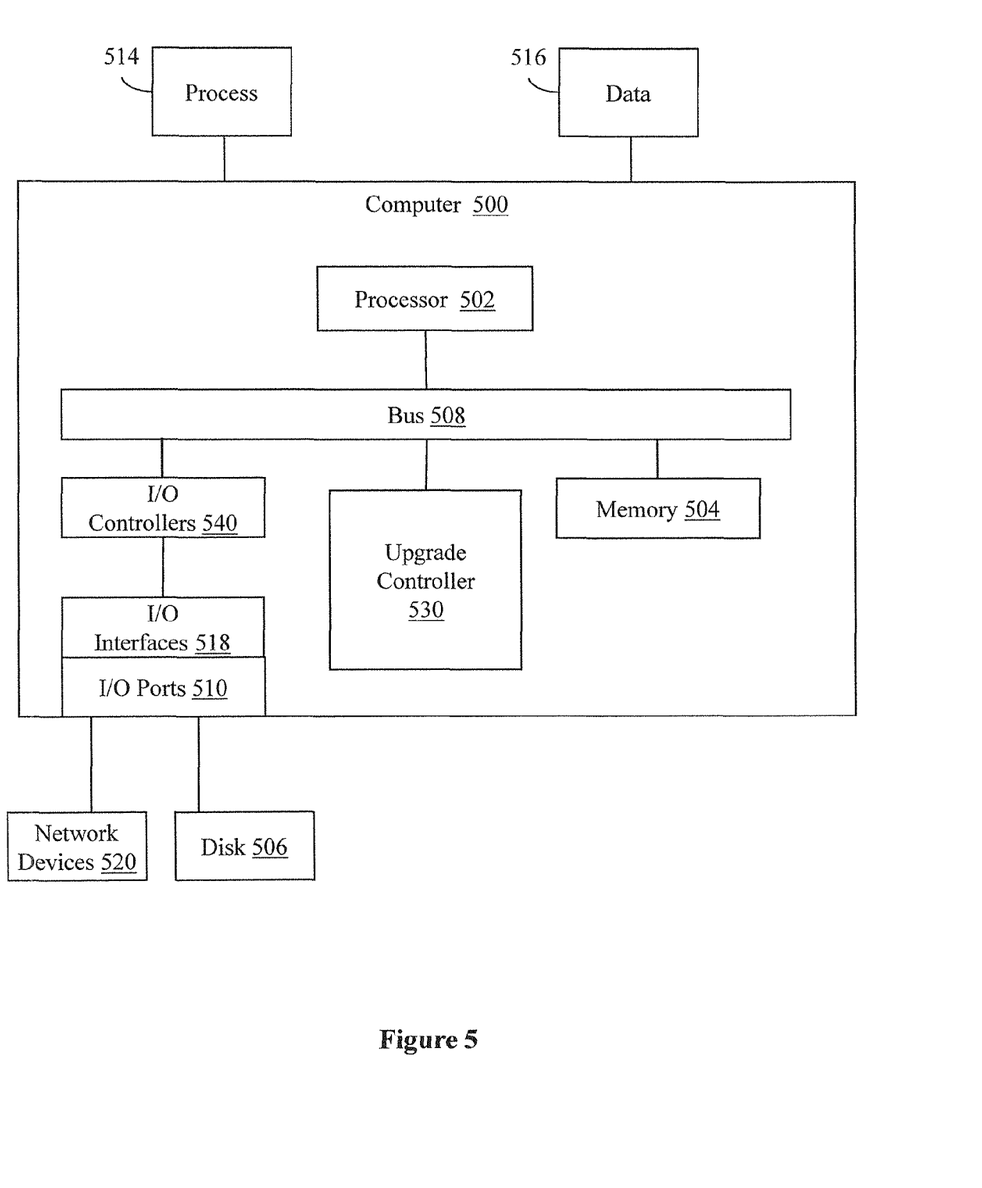
FIG. 5 illustrates an embodiment of a computing system in which example systems and methods, and equivalents, may operate.

FIG. 5 illustrates an example computing device in which example systems and methods described herein, and equivalents, are implemented, in some embodiments. The example computing device may be a computer 500 that includes a processor 502, a memory 504, and input/output ports 510 operably connected by a bus 508. In one example, the computer 500 may include an upgrade controller 530 configured to perform automated upgrade of an operating system using a configuration file as described in other embodiments (e.g., upgrade controller 100). In different examples, the upgrade controller 530 may be implemented in hardware, a non-transitory computer-readable medium with stored instructions, firmware, and/or combinations thereof to perform one or more computer implemented methods as described herein. While the upgrade controller 530 is illustrated as a hardware component attached to the bus 508, it is to be appreciated that in one example, the upgrade controller 530 could be implemented in the processor 502.

In one embodiment, upgrade controller 530 is a means (e.g., hardware, non-transitory computer-readable medium, firmware) for resolving a source location of an upgrade package based on a request received from a remote device.

The means may be implemented, for example, as an ASIC programmed to perform a lookup in a lookup table of source locations. The means may also be implemented as stored computer executable instructions that are presented to computer 500 as data 516 that are temporarily stored in memory 504 and then executed by processor 502.

Upgrade controller 530 may also provide means (e.g., hardware, non-transitory computer-readable medium that stores executable instructions, firmware) for re-directing the request to a selected source location.

Generally describing an example configuration of the computer 500, the processor 502 may be a variety of various processors including dual microprocessor and other multi-processor architectures. A memory 504 may include volatile memory and/or non-volatile memory. Non-volatile memory may include, for example, ROM, PROM, and so on. Volatile memory may include, for example, RAM, SRAM, DRAM, and so on.

A disk 506 may be operably connected to the computer 500 via, for example, an input/output interface (e.g., card, device) 518 and an input/output port 510. The disk 506 may be, for example, a magnetic disk drive, a solid state disk drive, a floppy disk drive, a tape drive, a Zip drive, a flash memory card, a memory stick, and so on. Furthermore, the disk 506 may be a CD-ROM drive, a CD-R drive, a CD-RW drive, a DVD ROM, and so on. The memory 504 can store a process 514 and/or a data 516, for example. The disk 506 and/or the memory 504 can store an operating system that controls and allocates resources of the computer 500.

The bus 508 may be a single internal bus interconnect architecture and/or other bus or mesh architectures. While a single bus is illustrated, it is to be appreciated that the computer 500 may communicate with various devices, logics, and peripherals using other busses (e.g., PCIE, 1394, USB, Ethernet). The bus 508 can be types including, for example, a memory bus, a memory controller, a peripheral bus, an external bus, a crossbar switch, and/or a local bus.

The computer 500 may interact with input/output devices via the i/o interfaces 518 and the input/output ports 510. An I/O controller 540 controls the i/o interfaces 518 and the input/output ports 510. Input/output devices may be, for example, a keyboard, a microphone, a pointing and selection device, cameras, video cards, displays, the disk 506, the network devices 520, and so on. The input/output ports 510 may include, for example, serial ports, parallel ports, and USB ports.

The computer 500 can operate in a network environment and thus may be connected to the network devices 520 via the i/o interfaces 518, and/or the i/o ports 510. Through the network devices 520, the computer 500 may interact with a network. Through the network, the computer 500 may be logically connected to remote computers. Networks with which the computer 500 may interact include, but are not limited to, a LAN, a WAN, and other networks.

DEFINITIONS AND OTHER EMBODIMENTS

It will be appreciated that the disclosed systems and methods are not intended to be limited to upgrading open source operating systems. In other embodiments, the disclosed systems and methods may be implemented to upgrade other types of software systems or applications. Additionally, the disclosed systems and methods may be implemented to upgrade other types of operating systems and are not limited to open source operating systems.

In another embodiment, the described methods and/or their equivalents may be implemented with computer executable instructions to perform computer implemented methods. Thus, in one embodiment, a non-transitory computer-readable medium is configured with stored computer executable instructions that when executed by a machine (e.g., processor, computer, and so on) cause the machine (and/or associated components) to perform the method.

While for purposes of simplicity of explanation, the illustrated methodologies in the figures are shown and described as a series of blocks, it is to be appreciated that the methodologies are not limited by the order of the blocks, as some blocks can occur in different orders and/or concurrently with other blocks from that shown and described. Moreover, fewer than all the illustrated blocks may be used to implement an example methodology. Blocks may be combined or separated into multiple components. Furthermore, additional and/or alternative methodologies can employ additional blocks that are not illustrated.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

ASIC: application specific integrated circuit.
CD: compact disk.
HTTP: hypertext transfer protocol.
LAN: local area network.
RAM: random access memory.
DRAM: dynamic RAM.
SRAM: synchronous RAM.

"Computer component", as used herein, refers to a computer-related entity (e.g., hardware, firmware, instructions in execution, combinations thereof). Computer components may include, for example, a process running on a processor, a processor, an object, an executable, a thread of execution, and a computer. A computer component(s) may reside within a process and/or thread. A computer component may be localized on one computer and/or may be distributed between multiple computers.

"Computer communication", as used herein, refers to a communication between computing devices (e.g., computer, personal digital assistant, cellular telephone) and can be, for example, a network transfer, a file transfer, an applet transfer, an email, an HTTP transfer, and so on. A computer communication can occur across, for example, a wireless system (e.g., IEEE 802.11), an Ethernet system (e.g., IEEE 802.3), a token ring system (e.g., IEEE 802.5), a LAN, a WAN, a point-to-point system, a circuit switching system, a packet switching system, and so on.

"Computer-readable medium", as used herein, refers to a non-transitory medium that stores instructions and/or data. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read.

In some examples, "database" is used to refer to a table. In other examples, "database" may be used to refer to a set of tables. In still other examples, "database" may refer to a set of data stores and methods for accessing and/or manipulating those data stores.

"Logic", as used herein, includes but is not limited to hardware, firmware, a non-transitory computer readable medium that stores instructions, instructions in execution on a machine, and/or combinations of each to perform a function (s) or an action(s), and/or to cause a function or action from another logic, method, and/or system. Logic may include a microprocessor, a discrete logic (e.g., ASIC), an analog circuit, a digital circuit, a programmed logic device, a memory device containing instructions, and so on. Logic may include one or more gates, combinations of gates, or other circuit components. Where multiple logics are described, it may be possible to incorporate the multiple logics into one physical logic. Similarly, where a single logic is described, it may be possible to distribute that single logic between multiple physical logics.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the disclosure is not limited to the specific details, the representative apparatus, and illustrative examples shown and described. Thus, this application is intended to embrace alterations, modifications, and variations that fall within the scope of the appended claims.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use. See, Bryan A. Garner, A Dictionary of Modern Legal Usage 624 (2d. Ed. 1995).

To the extent that the phrase "one or more of, A, B, and C" is used herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be used.

What is claimed is:

1. A non-transitory computer storage medium storing computer-executable instructions that when executed by a gateway server cause the gateway server to perform a method, the instructions comprising instructions configured for:
   receiving, by the gateway server over a network, a request for an upgrade package, wherein the request is received from a remote device initiating an operating system (OS) upgrade from a configuration file;
   resolving, in the gateway server, a source location for the upgrade package based, at least in part, on metadata in the request, wherein the metadata is from the configuration file,
   wherein resolving the source location includes assessing attributes of the remote device to determine whether the remote device is capable of running the OS upgrade;
   if the remote device is not capable of running the OS upgrade, returning an error message to the remote device;
   if the remote device is capable of running the OS upgrade, redirecting, by the gateway server, the request over the network to the resolved source location for the upgrade package to cause an upgrade server associated with the resolved source location to send the upgrade package to the remote device, wherein the resolved source location is remote from the gateway server and the remote device, and wherein redirecting the request to the resolved source location includes changing a destination of the request from an original destination to the resolved source location; and
   further comprising resolving the source location for the upgrade package by:
      determining one or more available source locations for the upgrade package by querying a lookup table that includes a plurality of source locations, wherein querying the lookup table includes using attributes of the remote device and the metadata from the request as inputs to the lookup table to determine the one or more available source locations,
wherein the attributes include a proximity of the remote device to the one or more available source locations and performance characteristics of the remote device, and wherein the metadata includes an identifier of the original destination; and
selecting a source location from the one or more available source locations based, at least in part, on one or more attributes of the remote device, wherein selecting the source location includes selecting according to current processing loads of the one or more available source locations and availability of additional upgrade packages.

2. The non-transitory computer storage medium of claim 1, wherein the configuration file is an RPM package manager (RPM) configuration file that identifies at least the upgrade package, wherein the configuration file is obtained individually and separate from the upgrade package, wherein the configuration file is for obtaining the upgrade package and is not associated with another upgrade package, and wherein the operating system is an open source operating system.

3. The non-transitory computer storage medium of claim 1, wherein the gateway server receives the request in response to the remote device initiating a package management system using the configuration file, and wherein the remote device is a client that is installing the upgrade package.

4. The non-transitory computer storage medium of claim 1, wherein the one or more attributes of the remote device include a list of previously installed upgrades on the remote device for the operating system.

5. The non-transitory computer storage medium of claim 1, wherein the gateway server intercepts the request on the network before the request arrives at an original destination identified in the request.

6. The non-transitory computer storage medium of claim 1, wherein the gateway server is a router, and wherein sending the request to the resolved source location includes redirecting the request from an original destination to the resolved source location.

7. An upgrade controller, comprising:
upgrade logic, comprising a hardware processor, configured to:
receive a request for an upgrade package, wherein the request is from a remote device initiating an operating system (OS) upgrade from a configuration file;
resolve a source location for the upgrade package by performing a lookup in a lookup table based, at least in part, on metadata in the request, wherein the metadata is from the configuration file and the source location is in a network associated with the upgrade controller,
wherein the upgrade logic is configured to resolve the source location upon assessing attributes of the remote device to determine whether the remote device is capable of running the upgrade package;
if the remote device is not capable of running the upgrade package, return an error message to the remote device; and
if the remote device is capable of running the upgrade package, redirect the request over a network to the resolved source location for the upgrade package to cause an upgrade server associated with the resolved source location to send the upgrade package to the remote device,
wherein the upgrade controller is in a gateway server that is remote from the resolved source location and the remote device, and wherein the upgrade controller is configured to redirect the request to the resolved source location by changing a destination of the request from an original destination to the resolved source location,
wherein the upgrade logic is further configured to resolve the source location for the upgrade package by:
determining one or more available source locations for the upgrade package from a plurality of source locations in the lookup table based, at least in part, on the metadata and attributes of the remote device,
wherein the attributes include a proximity of the remote device to the one or more available source locations and performance characteristics of the remote device, and wherein the metadata includes an identifier of the original destination, and
selecting a source location from the one or more available source locations based, at least in part, on the attributes of the remote device.

8. The upgrade controller of claim 7, wherein the configuration file is an RPM package manager (RPM) configuration file that identifies at least the upgrade package, wherein the configuration file is obtained individually and separate from the upgrade package, wherein the configuration file is for obtaining the upgrade package and is not associated with another upgrade package, and wherein the operating system is an open source operating system.

9. The upgrade controller of claim 7, wherein the upgrade logic is configured to receive the request in response to the remote device initiating a package management system using the configuration file, and wherein the upgrade logic is configured to receive the request by intercepting the request when the request is being communicated to the original destination.

10. The upgrade controller of claim 7, wherein the one or more attributes of the remote device include a list of previously installed upgrades on the remote device for the operating system.

11. The upgrade controller of claim 7, wherein the upgrade controller is embodied in a gateway server, wherein the upgrade logic is configured to intercept the request on the network before the request arrives at an original destination identified in the request.

12. The upgrade controller of claim 7, wherein the upgrade controller is embodied in a router, and wherein the upgrade logic is configured to send the request to the resolved source location by redirecting the request from an original destination to the resolved source location.

13. A method, comprising:
intercepting, in a gateway server, a request for an upgrade package wherein the request is received over a network from a remote device initiating a configuration file, a request for an upgrade package;
resolving, in the gateway server, a source location for the upgrade package from a lookup table based, at least in part, on metadata in the request,
wherein resolving the source location includes assessing attributes of the remote device to determine whether the remote device is capable of running the OS upgrade;
if the remote device is not capable of running the upgrade package, returning an error message to the remote device; and
if the remote device is capable of running the upgrade package, re-directing, by the gateway server, the request over the network to the source location resolved from the lookup table to cause an upgrade server associated with the source location to send the upgrade package to the remote device, wherein the resolved source location is remote from the gateway server and the remote device and wherein redirecting the request to the source location includes changing a destination of the request from an original destination to the source location, further comprising resolving the source location for the upgrade package by:

determining one or more available source locations for the upgrade package by querying a lookup table that includes a plurality of source locations for obtaining the upgrade package, wherein querying the lookup table includes using attributes of the remote device and the request as inputs to the lookup table to determine the one or more available source locations, wherein the attributes include a proximity of the remote device to the one or more available source locations and performance characteristics of the remote device, and wherein the metadata includes an identifier of the original destination; and selecting a source location from the one or more available source locations based, at least in part, on one or more attributes of the remote device.

14. The method of claim 13, wherein the configuration file is an RPM package manager (RPM) configuration file that identifies at least the upgrade package for an operating system (OS) of the remote device, wherein the metadata is from the configuration file, wherein the configuration file is obtained individually and separate from the upgrade package, wherein the configuration file is for obtaining the upgrade package and is not associated with another upgrade package, and wherein the operating system is an open source OS.

15. The method of claim 13, wherein the gateway server intercepts the request in response to the remote device initiating a package management system using the configuration file.

16. The method of claim 13, wherein the one or more attributes of the remote device include a list of previously installed upgrades on the remote device for an operating system of the remote device.

17. The method of claim 13, wherein the gateway server is a router, and wherein sending the request to the resolved source location includes redirecting the request from an original destination to the resolved source location.

* * * * *

UNITED STATES PATENT AND TRADEMARK OFFICE
CERTIFICATE OF CORRECTION

PATENT NO. : 9,176,725 B2  
APPLICATION NO. : 13/471710  
DATED : November 3, 2015  
INVENTOR(S) : Lal Page 1 of 1

It is certified that error appears in the above-identified patent and that said Letters Patent is hereby corrected as shown below:

In the Claims

In column 10, line 20, delete "(2d." and insert -- ($2^{nd}$ --, therefor.

Signed and Sealed this
Twenty-eighth Day of June, 2016

Michelle K. Lee
*Director of the United States Patent and Trademark Office*